(12) United States Patent
Conti

(10) Patent No.: US 6,816,071 B2
(45) Date of Patent: Nov. 9, 2004

(54) INFORMATION DISPLAY STATUS INDICATOR

(75) Inventor: Michael M. Conti, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 09/952,356

(22) Filed: Sep. 12, 2001

(65) Prior Publication Data

US 2003/0048714 A1 Mar. 13, 2003

(51) Int. Cl.[7] .............................................. G08B 21/00
(52) U.S. Cl. .................... 340/540; 340/500; 340/815.4; 348/231.1; 348/231.99
(58) Field of Search ................................ 340/540, 500, 340/815.4; 348/208.6, 231.1, 231.99, 333.04, 331.01; 358/335, 906

(56) References Cited

U.S. PATENT DOCUMENTS

| | | | | |
|---|---|---|---|---|
| 5,481,303 A | * | 1/1996 | Uehara | 348/231 |
| 5,633,976 A | * | 5/1997 | Ogino | 348/231 |
| 5,905,528 A | * | 5/1999 | Kodama | 348/220 |
| 6,122,411 A | * | 9/2000 | Shen et al. | 382/299 |
| 6,147,703 A | * | 11/2000 | Miller et al. | 348/220 |
| 6,195,513 B1 | * | 2/2003 | Nihei et al. | 396/332 |
| 6,429,896 B1 | * | 8/2003 | Aruga et al. | 348/233 |

* cited by examiner

*Primary Examiner*—Brent A. Swarthout
(74) *Attorney, Agent, or Firm*—Marger Johnson & McCollom, P.C.

(57) ABSTRACT

An information display status indicator is described. The status indicator is typically connected to a user device that uses consumable resources. Icons representing resource usage are shown on the status indicator as the resources are used. The icons could represent memory resources available to the device. The icons, which are patterned around a perimeter of the status indicator, are turned on sequentially to form a complete loop when the memory becomes full. Additionally, each icon may be made of a set of pixels or blocks where each set is individually controllable.

24 Claims, 7 Drawing Sheets

200

| LINE | A | B | C |
| --- | --- | --- | --- |
| 1 | 0 | 1000 | 1 |
| 2 | 1000 | 2000 | 1-2 |
| 3 | 2000 | 3000 | 1-3 |
| 4 | 3000 | 4000 | 1-4 |
| 5 | 4000 | 5000 | 1-5 |
| 6 | 5000 | 6000 | 1-6 |
| 7 | 6000 | 7000 | 1-7 |
| 8 | 7000 | 8000 | 1-8 |
| 9 | 8000 | 9000 | 1-9 |
| 10 | 9000 | 10,000 | 1-10 |
| 11 | 10,000 | 11,000 | 1-11 |
| 12 | 11,000 | 12,000 | 1-12 |
| 13 | 12,000 | 13,000 | 1-13 |
| 14 | 13,000 | 14,000 | 1-14 |
| 15 | 14,000 | 15,000 | 1-15 |
| 16 | 15,000 | 16,000 | 1-16 |
| 17 | 16,000 | 17,000 | 1-17 |
| 18 | 17,000 | 18,000 | 1-18 |
| 19 | 18,000 | 19,000 | 1-19 |
| 20 | 19,000 | 20,000 | 1-20 |
| 21 | 20,000 | 21,000 | 1-21 |
| 22 | 21,000 | 22,000 | 1-22 |
| 23 | 22,000 | 23,000 | 1-23 |
| 24 | 23,000 | 24,000 | 1-24 |

FIG. 4

INFORMATION DISPLAY STATUS INDICATOR

1. TECHNICAL FIELD

This disclosure relates to information display devices and, more particularly, to an information display device including a status indicator to indicate a percentage of available resources remaining as the resources are used.

2. BACKGROUND

In products that use consumable resources, it is helpful to indicate the status of the resources to the product user. For instance, virtually every automobile includes a fuel gauge in its instrument cluster to indicate to the driver how much fuel is in the fuel tank. Knowing the fuel level allows the driver to take appropriate action at the right time, such as by putting more gas in the car before the gas tank is empty.

Consumer devices also use consumable resources. For example, a portable videotape camera uses both videotape and battery power in creating a video movie. However, unlike the fuel gauge, no real conventions exist to best provide feedback of the status of consumable resources in these devices. Some manufactures use tape counters, while others use flashing icons to denote that the tape is soon ending. Some video camera manufacturers provide no feedback of these resources to the user at all—when the tape stops moving, the user knows that the videotape is completely used or the battery is dead. Providing a status indicator of a consumable resource in a consumer device that is intuitive, informational, accurate and attractive remains an elusive goal.

BRIEF DESCRIPTION OF THE DRAWINGS

The invention may be best understood by reading the disclosure with reference to the drawings, wherein:

FIG. 4 is a table showing an example of how to implement steps shown in the flowchart of FIG. 3.

DETAILED DESCRIPTION OF THE EMBODIMENTS

Embodiments of the invention include an information display that is both intuitive and accurate. Information about the resources of the device incorporating the display is immediately conveyed to the user of the device, who then makes decisions based on this information.

Figure 1A:
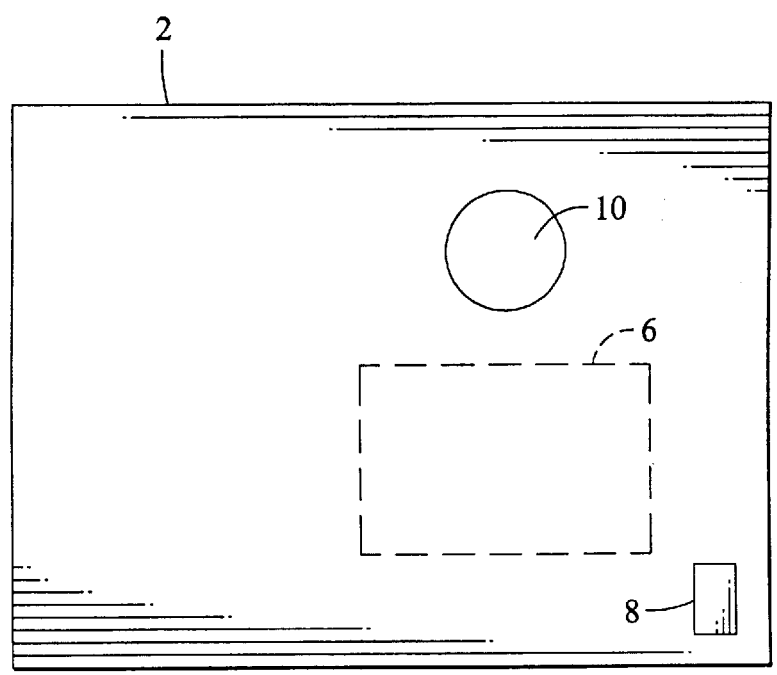
FIG. 1A is a diagram of a digital camera including an information display according to an embodiment of the invention.

FIG. 1A shows a video/still camera 2 having an attached information display 10. The camera 2 is capable of taking either still pictures or a series of still pictures that, when viewed successively, create a video movie. The camera 2 stores the pictures in an internal memory device 6, indicated by dotted lines. The memory device 6 will be discussed in more detail with reference to the following figures. Additionally, the camera 2 includes a Universal Serial Bus (USB) connector 8 that allows the camera to connect to a host computer (not shown) via a standard USB cable.

Figure 1B:
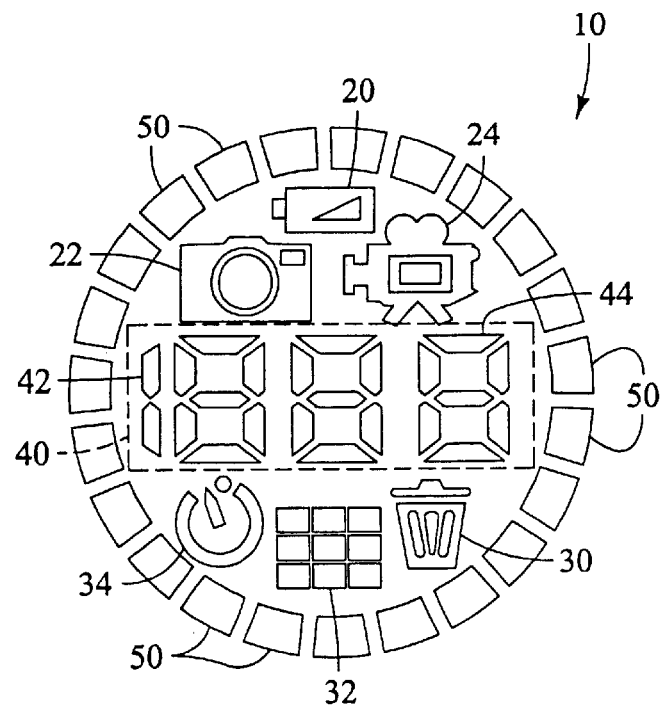
FIG. 1B is a more detailed view of the information display shown in FIG. 1A.

FIG. 1B shows a detail view of the information display 10 that is attached to the camera 2. The display 10 has an active area that is circular shape with a 17 mm diameter. Icons on the display 10 provide immediate information about the camera 2. For instance, the display 10 includes a low battery icon 20 that is present on the display when the voltage of batteries stored in the camera 2 drops below a threshold level (and when the camera is not tethered to the host computer). When the low battery icon 20 appears on the display 10, it indicates to the user that the batteries should soon be replaced.

Other icons on the display 10 give information about which mode the camera 2 is in. A snap-shot icon 22 and a video icon 24 indicate whether the last item stored in the memory 6 was a video clip or a snap-shot. The user can take either video clips or snap-shots by pressing appropriate buttons on the camera 2. If the display 10 is turned on, one or the other of these icons 22, 24 is active.

A delete icon 30, a resolution icon 32, and a timer icon 34 indicate other possible modes of the camera 2. When the camera 2 is in the corresponding mode, the icon is displayed on the display 10. These icons, 30, 32 and 34 operate more or less independently, in that they can operate no matter which mode, snap-shot or video, that the camera 2 is in. For instance, the delete icon 30 indicates that the user is a delete mode, and will delete the most recent addition to the memory 6 of the camera 2 regardless of whether the most recent addition to the memory is a snap-shot video. Additionally, the resolution icon 32 is always present while the display 10 is active; showing either a high or low resolution symbol that indicates which mode the camera 2 is currently in. When the timer icon 34 is shown on the display, the camera 2 is in its self-timer mode.

A counter display 40, formed of one two-segment icon 42 and three seven-segment icons 44 is centrally located on the display 10. The counter display 40 shows the user a count of how many separate items, snap-shots or video clips, have been stored in the memory 6 of the camera 2.

Except for the low battery icon 20, none of the icons described above, including the snap-shot icon 22, the video icon 24, the delete icon 30, the resolution icon 32, and the timer icon 34, measure resources used by the camera. Those icons are informational only and do not show a status of the consumable resources in the camera 2. The counter display 40 generally shows the user the number of items stored in the memory 6, but does not indicate how much of the memory resources are remaining. Because a single video clip can fill the entire memory 6, the memory could be completely full although a number as low as "1" is shown on the counter display 40. Alternatively, in a low-resolution mode, the camera 2 may store over 1000 snap-shots in its memory 6. Therefore, a user does not know, simply from looking at the counter display 40 how much of the memory 6 resources are remaining in the camera 2.

Instead, the display 10 uses a set of memory icons 50 to form a memory resource status indicator. In the embodiment shown in FIG. 1B, there are 24 icons in the set of memory icons 50, but there could be any number of icons shown on the display 10 in other embodiments. The memory icons 50 form a circle and are aligned along the perimeter of the display 10. In operation, the memory icons 50 individually turn on in a sequential manner as the memory 6 in the camera 2 fills, and turn off individually as data in the memory is deleted. Thus, when the memory 6 is empty, none of the memory icons 50 are lit. Similarly, when the memory 6 is full, all of the memory icons 50 are lit. Because there are 24 memory icons 50 on the display 10, each of the individual icons represents ¹⁄₂₄ of the space in the total memory 6. Of course if there were more or fewer than 24 memory icons 50 on the display 10, the portion of the memory 6 that each icon would represent would be proportional to the actual number of icons, and not ¹⁄₂₄.

Figure 2:
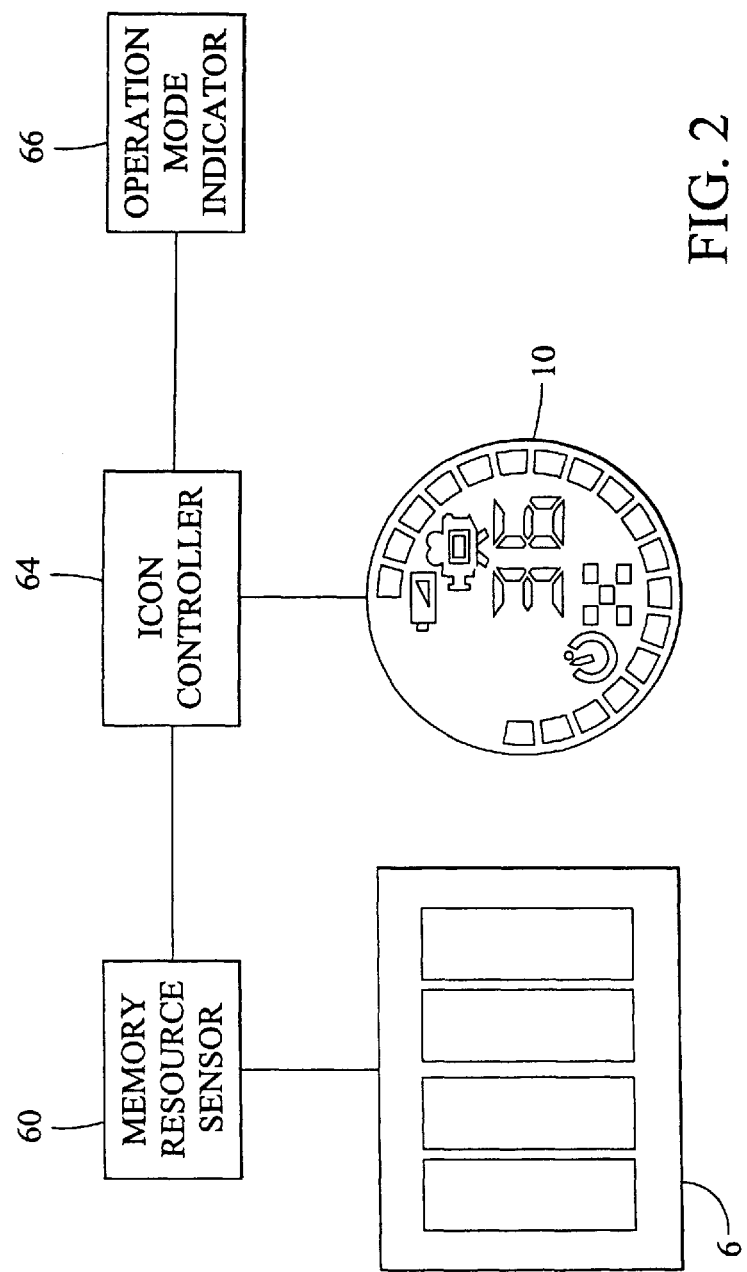
FIG. 2 is a functional block diagram showing components used in embodiments of the invention.

FIG. 2 is a diagram showing functional blocks that can be used in embodiments of the invention. The memory device 6, discussed above, stores the snap-shots and video clips in digital form as the user makes them. As more snap-shots and video are stored in the memory 6, the amount of remaining resources decreases. A memory resource sensor 60 measures the amount of memory 6 resources that have been used and are remaining, and passes this information to an icon controller 64. The icon controller 64 also receives information about which mode the camera 2 is in, provided by an operation mode indicator 66. Possible modes of the camera 2 that affect the display 10 are whether the camera is tethered to a computer using the USB connector 8, and whether the camera 2 is in a low power or "sleep" mode. The icon controller 64 uses the present mode of the camera 2 and the memory resource information provided to it and produces appropriate signals to drive the correct icons on the display 10.

For purposes of the invention, the memory 6 can be any type of memory capable of storing the digital snap-shots and video. For low-cost applications, Synchronous Dynamic Random Access Memory (SDRAM) may be used, as it is cheaper on a "per-byte" basis than other memory types, while still having very fast operation speeds. Other types of memory may also be suitable, such as Electrically Erasable Programmable Read Only Memory (EEPROM) or Flash EEPROM, for instance where the data stored in the memory 6 must remain intact even when no battery power (or equivalent) is provided to the camera 2. Some memory controllers require the use of a particular memory type, and, in that case, choosing the memory controller would necessarily determine the type of memory 6 needed. Also the invention can be implemented with any size of memory 6. Each of the memory icons 50 in the display 10 represents an equal portion of the memory 6 used by the camera 2, so the memory can be any size. In one example embodiment, the memory 6 is an 8 Megabyte SDRAM.

The memory resource sensor 60 is coupled to the memory 6 and measures the memory resources used, in real time. The memory sensor 60 can be implemented in either hardware or software as needed. A hardware implementation could store a number of rows/columns that have been written to the memory 6 since a latest reset or erase. By knowing how many rows and columns are storing data in the memory 6, the memory sensor 60 could know how much of the memory is remaining for use. Alternatively, the memory sensor 60 could be implemented in software, or firmware stored in a non-volatile memory and later run on a microprocessor. In those embodiments, a storage location, for example a register or a defined variable, could be used to store exactly how many bytes of data have been used in the memory 6. As bytes are written to the memory 6, the register or variable is incremented. As bytes are deleted, the register or variable is decremented. The percentage of available memory 6 resources is easily ascertainable by dividing the amount already stored in the register by the total capacity of the memory 6.

There are many other ways to implement the functionality of the memory sensor 60 without undue experimentation that could be implemented by one skilled in the art.

The information from the memory sensor 60 is passed to the icon controller 64. In one embodiment, a SPL15A I/O controller by Sunplus Technology Company of Taiwan is used for functions of the icon controller 64. The icon controller 64 uses internal logic to determine which individual icons will appear on the display 10, and at what times they will appear.

To help decide which icons to show on the display 10, the icon controller 64 learns the current state of the camera 2 from the operation mode indicator 66. Three basic modes of the camera 2 affect the operation of the display 10. One of the modes is normal operation, where the display 10 operates as described above, the icons are displayed and information is relayed to the user as usual. Another mode is a "tethered" mode, where the camera 2 is connected to a computer by the USB connector 8. While in tethered mode, the camera 2 can store its data on the connected computer, rather than using its internal memory 6. The data can be stored either as each snap-shot or video is taken by the user, or can be uploaded in bulk once a certain memory threshold is reached. Managing where the data is stored, either on the camera 2 or the connected computer is automatic, and does not require user input.

The third mode that affects the operation of the display 10 is the sleep mode, where the display is turned off after a period of non-use of the camera 2 in an effort to conserve battery power. When the display 10 is turned off, it is simply blank and does not use any battery power. Other modes of the camera 2 are possible, such as a deep-sleep mode, where the memory 6 is not refreshed, as is typically done with SDRAM, or a USB suspend mode where the camera is tethered to the connected computer and the operating system of the computer goes to a stand-by mode. Because the display 10 is not operational during any of these modes, the operation mode indicator 66 need not differentiate them for the icon controller 64. Therefore, for this embodiment of the invention, the operation mode indicator 66 needs only to report to the icon controller 64 if the camera 2 is in normal operating mode, tethered mode, or sleep mode.

As mentioned above, when the camera 2 is in sleep mode, the icon controller 64 sends a signal to the display 10 (which, in fact, could be the absence of a waveform or other signals) to keep the display blank, i.e. no icons appearing on the display. The sleep mode is universal, and the camera 2 can be in sleep mode whether it is tethered to the connected computer or not. In other words, the camera 2 can "sleep", and the display 10 will go blank, after a period of inactivity regardless of whether or not the camera is connected to the computer via the USB connector 8.

When the camera 2 is in tethered mode, and not in the sleep mode, embodiments of the invention use the memory icons 50 to create a pattern on the display 10. An example pattern could be a series of three adjacent memory icons 50 that seem to "spin" around the display 10. The icon controller 64 creates this pattern on the display 10 by turning on the first three icons in the memory icons 50, and then, after a short delay, simultaneously turns on the next icon in the display while turning off the last icon on the pattern. For instance, if the pattern is "spinning" clockwise and the first three memory icons 50 are displayed, the icon controller 64 turns on the fourth memory icon while turning off the first memory icon. Next the fifth memory icon 50 is turned on and the second icon turned off. When timed correctly, this action creates a "spinning" pattern of three memory icons 50 around the perimeter of the display 10. The icon controller 64 manages the speed of the "spinning" memory icons 50 by controlling how fast the individual icons are turned on and off. One aesthetically pleasing pattern is created when the memory icons 50 spin at a rate of one complete rotation around the perimeter of the display 10 every two seconds, although other patterns, animations, directions and speeds are possible.

Conversely, the display 10 could show the same memory 6 resource information whether or not the camera 2 was operating in tethered mode. In that case, a program running on the computer connected to the camera 2 through the USB connector 8 could operate as the memory resource sensor 60 and easily keep track of the amounts of memory 6 resources available and already used by the camera, and could provide that information to the icon controller 64. However, in this last example, a user of the camera 2 would not have a special indication that the camera was tethered to a computer, although an additional icon could be added to the display 10 to provide just this information. Also, in this last example, given the fact that the camera 2 has much more total "memory" available to it, most likely in the form of space on the hard drive, it may take an extremely long time for the number of memory icons 50 to change on the display 10 as the "memory" is filling up and, consequently, this may cause the user to think that there is an error. Finally, regarding the operation of the memory icons 50 in the tethered mode, the status of the other icons on the display 10 is unimportant; they could be on or off. The implementation of either choice has no effect on the memory icons 50.

In normal operation of the display 10, i.e., when the camera 2 is not tethered to a connected computer and is not in the sleep mode, the icon controller 64 turns on a number of the individual memory icons 50 proportional to the amount of memory 6 resources used. When no data has been written to the memory 6, none of the memory icons 50 are turned on. As the memory 6 begins to fill with data, the first memory icon 50 will turn on. As the memory 6 continues to be filled, the memory resource sensor 60 relays this information to the icon controller. When enough data has been written to the memory 6, a successive memory icon 50 is turned on in addition to the icon or icons that were already on. This process continues until all of the icons are turned on, which indicates that very little or no space in the memory 6 remains available for further data storage, and the user must download the stored data to make more memory space available.

Because the memory icons 50 provide valuable feedback to the user of the camera 2, it is important to promptly and accurately display the amount of memory 6 resources consumed by the camera. Because there are 24 icons, the icon controller 64 will turn on the next memory icon when the next 1/24 of the total memory 6 has been filled. For example, if there are 24,000 total bytes available in the memory 6, then each of the memory icons 50 represents 1000 bytes of the memory. Therefore, if 17 icons are lit on the display 10, then the user knows that the memory 6 currently stores between 16,000 and 17,000 bytes, or between 67 and 71 percent of the total capacity of the memory 6.

To provide immediate feedback to the user of the camera 2, in at least one embodiment, the first memory icon 50 turns on when the first byte of data is written to the memory 6. This informs the user that the camera 2 is operating properly. If instead the camera 2 only displayed the memory icons 50 after the corresponding sections of the memory 6 were completely full, the user may need to take several pictures before even the first memory icon is turned on and displayed. This could lead to a situation where the camera 2 is operating properly, but the user believes it not to be functioning because no memory icons 50 are displayed. Instead, by turning on the memory icons 50 when the first byte of the corresponding section of the memory 6 is written to, the user immediately knows that the camera 2 is working properly.

Sending the proper signals from the icon controller 64 to light the appropriate icons on the display 10 is very implementation specific. Any type of display 10 that can perform the necessary functions can be used. In one embodiment, mentioned above, the icon controller 64 can be the SPL15A I/O driver. That driver drives a Liquid Crystal Display (LCD) that can be used as the display 10. LCDs generally come in two different types, a dot-matrix type and an icon type. A dot-matrix type LCD has many individual pixels, each having a different X-Y coordinate. Many modern computer monitors use a dot-matrix LCD display. Text and graphics can be reduced to a series of pixels that are on and off. This series, when displayed, represents the desired object.

An icon type LCD display, conversely, is made of preselected areas of a display that operate as single units to either turn off or turn on all at the same time. For instance, with reference to FIG. 1B, the video icon 24 is actually made of two solid patterns on an icon type LCD. One solid pattern forms the border of the movie camera, and the other solid pattern is the small rectangle inside the camera, representing the film or tape. These two solid patterns are always turned on and off together as a group, and thus together form the video icon 24.

The display 10 shown in FIG. 1B is an icon type LCD, where each of the icons shown on it is formed from solid patterns. This type of display is widely used in inexpensive devices because it is cheaper to produce and implement than the matrix-type LCD.

Driving the display 10, once the icon controller 64 determines which icons should be driven, is implementation specific and these implementations are well known in the art. This invention applies to any method of showing the proper icons on the display 10 once the icon controller 64 determines the correct icons to be driven, regardless of the type, size, quality, location or implementation of the display. Additionally, this invention is operable with any type of display that can show the icons. For instance, the display 10 could make up a portion of an overall larger display or view shown to the user where the display 10 provides its information superimposed on whatever is shown on the large display. The display 10 could even be projected onto a viewfinder or screen so that the user could view the display while taking pictures or otherwise operating the device. Although the above text described an LCD display as the display 10, those skilled in the art could implement the display 10 in any form, such as by the LCDs described above, a Cathode Ray Tube (CRT), a Light Emitting Diode (LED) display, a fluorescent or Vacuum Fluorescent Display (VFD), an Electroluminescent Display (ED), or any other type of display that is capable of showing the desired information.

Figure 3:
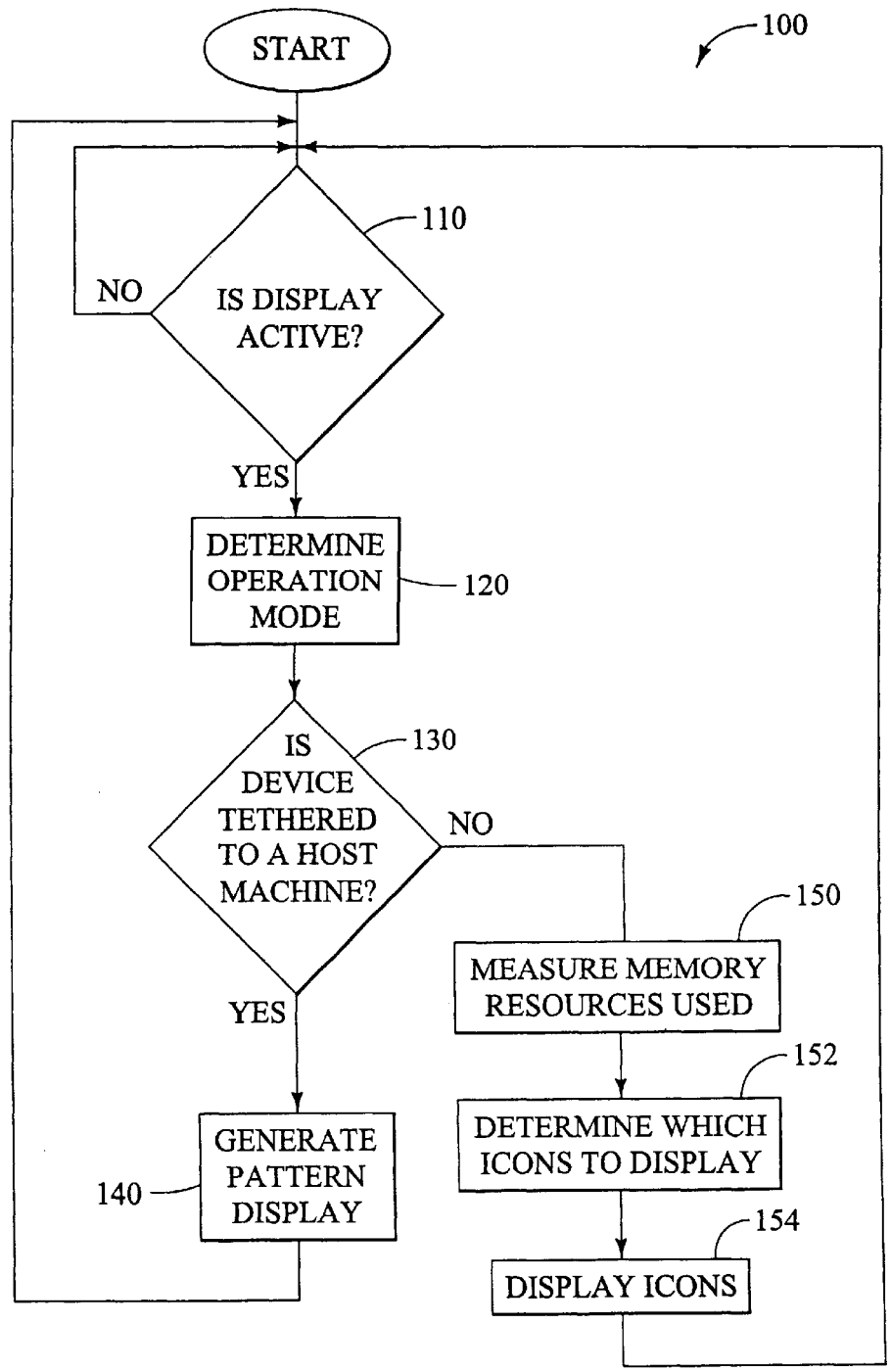
FIG. 3 is a flowchart showing example method that can be used in embodiments of the invention.

FIG. 3 is a flowchart showing an example flow 100 that can be used by the icon controller 64 of FIG. 2 to determine which icons to show in the display 10, according to embodiments of the invention. The flow 100 begins at step 110, which determines whether the display 10 is even active on the device. As discussed above, the display 10 will turn off when the camera 2 (or other device to which the display is attached) enters a sleep mode in order to preserve battery life. If the camera 2 is in sleep mode, the flow 100 exits in the NO direction, which simply loops back to step 110. As long as the camera 2 is in sleep mode, or an equivalent mode where the display 10 is turned off, the flow 100 will remain in an endless loop at step 110.

If instead the camera 2 is not in sleep mode, then the display 10 is active and the flow 100 determines which icons to show on the display. In step 120 the flow 100 determines which operation mode the camera 2 is in. This step is performed in conjunction with the operation mode indicator 66 of FIG. 2. If the camera 2 is in tethered mode, where it is connected to a computer, step 140 shows a pattern on the display 10. As discussed above, the pattern can be any pattern possible made out of the 24 memory icons 50, such as the spinning three-icon pattern discussed with reference to FIG. 2. If instead step 130 determines that the camera 2 is not in tethered mode, it is in standard operational mode where the memory icons 50 represent the amount of memory 6 resources already used by the camera.

If the camera is in standard operational mode, step 150 measures the percentage of memory 6 capacity used. As discussed above, the memory resource sensor 60 of FIG. 2 can perform this step. After the amount of the memory 6 that is currently used in the camera 2 is known, step 152 determines which of the 24 icons, if any, will be lit on the display 10. Finally, in step 154 the icon controller 64 sends the appropriate signals to the display 10 to show the selected icons on the display to be viewed by the camera 2 user, as described above with reference to FIG. 2.

One example way to implement step 152 in FIG. 3 is with a look-up table 200, for example the one shown in FIG. 4. Table 200 contains as many lines as there are memory icons 50 in the display 10. For the example described with reference to FIG. 2, there are 24 icons, so the table 200 includes 24 lines. Each line contains three columns, A, B, and C. Column A is a lower bound number, column B is an upper bound number, and column C is the number of icons lit if the amount of data used in the memory 6 is between the numbers in columns A and B. The numbers in the columns A and B differ by a given amount for each different line. For example, Column A includes a 0 in line 1, 1000 in line 2, 2000 in line 3, etc., while Column B includes 1000 in line 1, 2000 in line 2 and 3000 in line 3, etc. The amount each column A and B increments is a number equal to the number of memory icons on the display 10 divided by the total amount of memory space in the memory 6. In this example, the memory 6 has a total of 24,000 bytes available to it. Since there are 24 icons, the amount that column A and B change for each line in the table is 1000. Column A in the table 200 begins in line 1 with the lower bound of what is measured by the memory icons 50, in this case 0, while Column B ends in line 24 with the upper bound of what is measured by the memory icons, in this case 24,000. Column C shows which memory icons 50 will be shown on the display 10 when the particular line is selected.

In operation, using the look-up table 200 is straightforward. Once the memory resource sensor 60 (FIG. 2) determines the memory 6 resources that are currently in use, that amount is checked against columns A and B. When the used memory resources fall between the numbers in columns A and B in the same line, the number of memory icons 50 that appear in Column C for that line are shown on the display 10. For instance, if the used memory 6 resources are 6700 bytes, then that number falls between 6000 and 7000 (row 7) and the first seven memory icons will appear on the display 10. If none of the above conditions are satisfied, i.e., the amount of memory 6 resources is less than or equal to the number in Column A of the first line, then no memory icons 50 are shown in the display 10.

A more general look-up table could be constructed of N number of lines, where N is the number of memory icons 50 shown on the display 10. Column A would begin with 0 and increment in each successive line an amount equal to the total number of memory icons 50 on the display 10 divided by the total amount of memory 6 resources measured by the memory icons. Column B would end in line N with the maximum amount of memory 6 resources measured, and decrement in each previous line by the same amount that A incremented by. The number of segments lit in each line number (Column C) is from 1 to a number equaling the line number.

Figure 5:
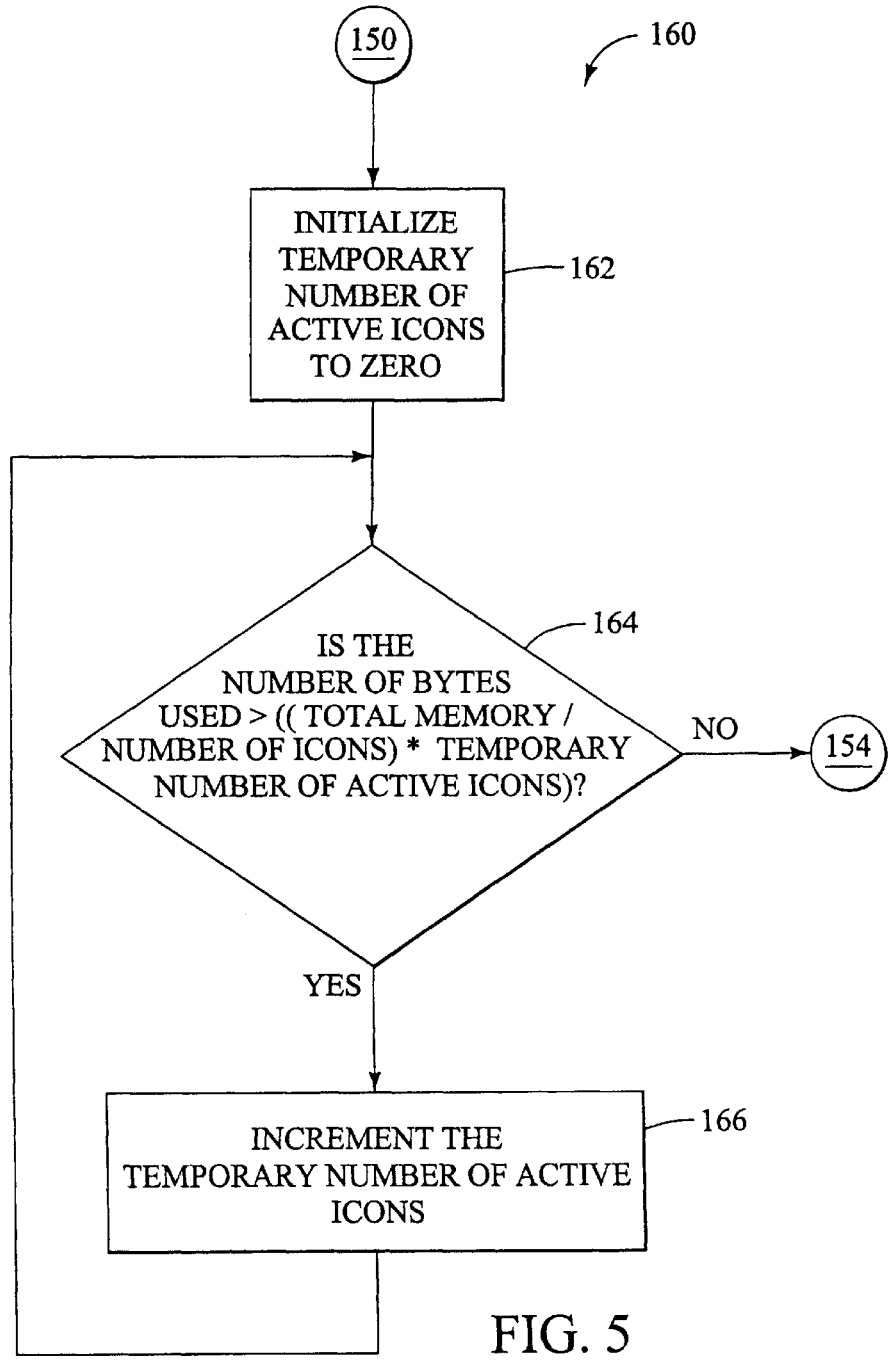
FIG. 5 is a flowchart showing an alternative method to that shown in FIG. 4.

FIG. 5 shows a flow 160 that can also be used to implement step 152 of FIG. 3. The flow 160 starts after step 150 of FIG. 3 by initializing a temporary number of active memory icons to zero in step 162. Step 164 compares the total memory 6 resources presently used (received from the memory resource sensor 60 of FIG. 2) to a number formed from the following equation:

$$((\text{Total resources in the memory 6/total \# of memory icons 50 in the display 10}) * \text{the temporary number of active memory icons}) \quad [\text{Equation (1)}].$$

Step 164 is a comparison block. In step 164, if the total memory resources presently used are greater than the number from equation (1), step 166 increments the temporary number of active memory icons 50 by 1, and the flow 160 returns to the comparison block of step 164. The flow 160 will cycle through the comparison step 164 and the incrementing step 166 until the total memory resources presently used is less than the number calculated in equation (1). When that condition is met, the flow 160 returns back to step 154 of FIG. 3, and the last number used for the temporary number of active memory icons becomes the number of memory icons 50 that will be shown on the display 10 in step 154 of FIG. 3.

As an alternative to simply showing the number of memory icons 50 in the display 10 corresponding to the memory 6 resources used, each of the individual memory icons could also be subdivided to provide even more detail about the present state of the memory resources. For example, each of the memory icons 50 could be made out of 5 distinguishable blocks. In the example where the memory 6 has 24,000 bytes and there are 24 memory icons 50 each subdivided into 5 blocks, then each block within each memory icon would represent just 200 bytes. In that way the user of the camera 2 would know very specifically (within 200 bytes) what the actual amount of memory 6 left in the camera was.

A further embodiment of the display 10 could include a different appearance for one or more of the memory icons 50. For example, the upper-most memory icon 50, i.e. the one indicating the highest portion of the memory 6 resources used, could look different than the other memory icons. It may be shown in outline form, for example, or may take the form of an arrow. If the display 10 is capable of showing shading rather than only distinguishing between on and off, then that feature could also be used to differentiate one or more of the memory icons 50. For example, the upper-most memory icon 50 that is on could begin lightly shaded, then grow in contrast intensity until it is completely darkened (or lightened), to represent that that portion of the memory 6 resources are completely full.

Further embodiments could include different shapes of the display 10, such as square or octagonal, or any other shape used to accommodate the form factor of the host device. Additionally, the memory icons 50 could be non-segmented so that they touch adjacent icons. That way a display 10 could have a continuous "band" of individual icons representing the resources consumed. A further consideration is that the memory icons 50 need not be limited to measuring memory 6 resources. They could additionally measure other resources, such as remaining battery power, or whether an amount of ambient light is sufficient for proper operation of the camera 2. These different measurements could appear automatically as the display 10 cycles through these measurements, or they could be controlled by user input, such as by pressing appropriate buttons. An even further consideration is that the memory icons 50 could show additional patterns while in different modes. Recall that the spinning pattern of three memory icons 50 appears on the display 10 while the camera 2 is in tethered mode. Other patterns could be used to indicate other modes, such as a cradled mode when the camera 2 is in a docking cradle, or a recharging mode when batteries are being recharged, etc.

These additional embodiments would require changes to the display 10 and to the icon controller 64 of FIG. 3, but such changes are within the scope of one skilled in the art.

Figure 6:
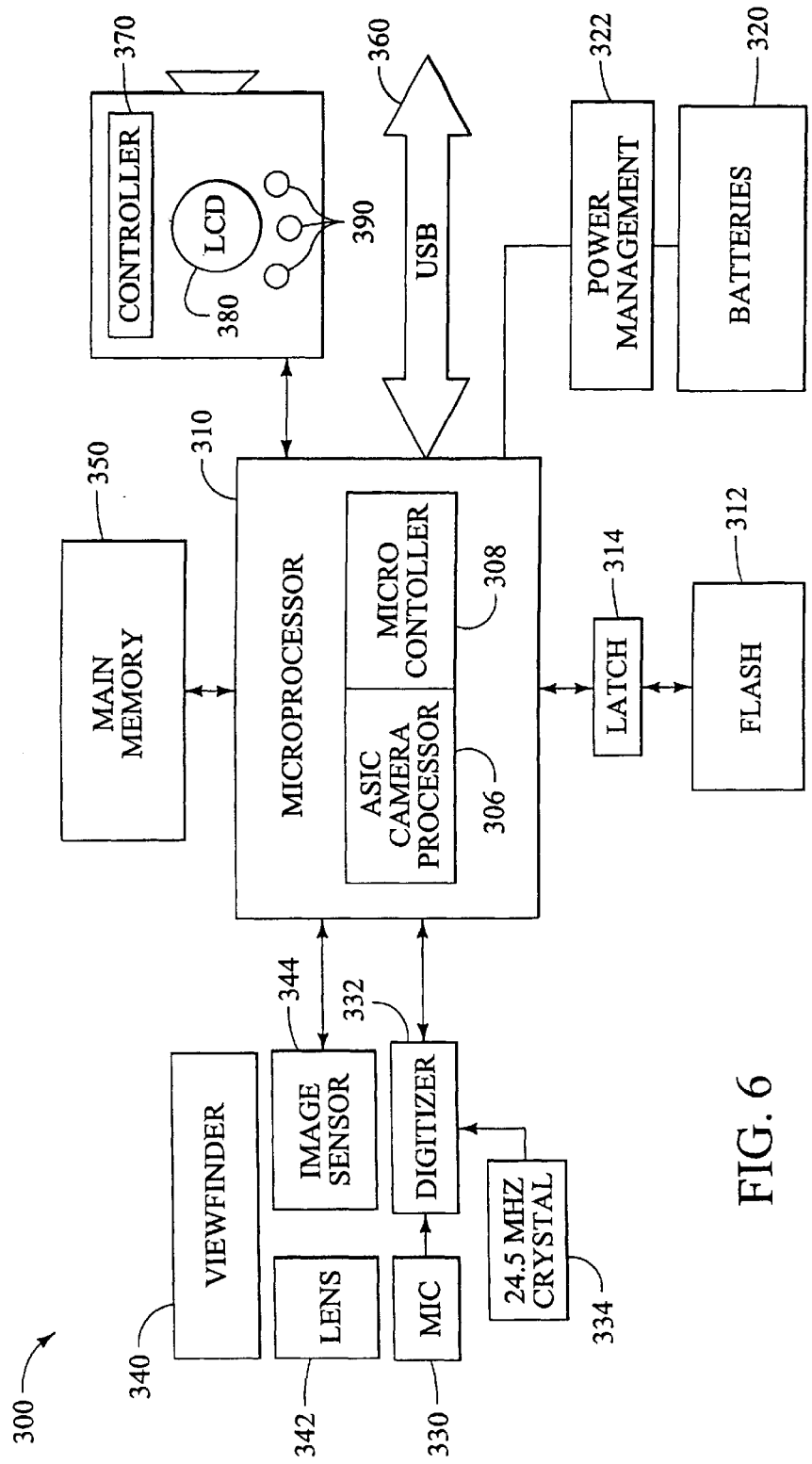
FIG. 6 is an expanded functional block diagram showing components that make up a consumer device incorporating an embodiment of the invention.

FIG. 6 shows example architecture for a consumer device including a display according to an embodiment of the invention. In this example a camera 300 uses an Application Specific Integrated Circuit (ASIC) camera processor 308, which could be, for example, a Sunplus SPCA551A, available from Sunplus Technology Company of Taiwan. Also tied to the camera processor 306 is a microcontroller core 308 that could be, for example, based on the Intel 8051 8-bit microprocessor. In the following description, these circuits 306, 308 will be referred to as an ASIC microprocessor 310, without delineation of which circuit 306, 308 actually performs the specific functions described.

Firmware that controls the ASIC microprocessor 310 is stored in a flash memory 312 in a conventional manner. The camera 300 is powered by a battery pack 320 which could be, for example, 4 batteries. Power management functions 322 couple the ASIC microprocessor 310 to the battery pack 322 and work as an interface to ensure that the camera 300 does not consume excess power.

A microphone 330 couples to a digitizer 332 that converts the analog sounds sensed by the microphone to digital data. A crystal 334 is also coupled to the digitizer 334 to provide a standard oscillation signal. Output from the digitizer 332 is sent to the ASIC microprocessor 310.

The camera 300 includes a standard viewfinder 340 and lens 342. An image through the lens is fixed on an image sensor 344, for example a PB0111C sensor available from Photobit Technology Corporation of Pasadena Calif., which digitizes the image and passes it to the ASIC microprocessor 310.

For data storage, the camera 300 includes a computer memory 350. The memory can be any standard type, DRAM, EEPROM, Flash EEPROM, etc., and can be any size that is operational within the other implementation guidelines. In one embodiment the memory 350 is an 8 Megabyte SDRAM.

For coupling the camera 300 to a host device, the camera includes a USB connection 360. This connection allows the camera to be controlled by a computer program running on a connected computer (not shown) through the USB bus.

A display controller 370 is also coupled to the ASIC microprocessor 310 and is used to control a display 380. The display 380 could be implemented by the LCD display 10 described with reference to FIG. 2. Additionally, the display controller 370 manages input buttons 390, which are used to provide different command inputs to the camera 300.

The firmware stored in the flash memory 312 can cause the ASIC microprocessor 310 to implement the functions of the memory resource sensor 60 shown in FIG. 2. Because the ASIC microprocessor 310 is directly coupled to the memory 350, it can easily monitor the resources used in that memory. Additionally, the firmware stored in the flash memory 312 can cause the ASIC microprocessor 310 to implement the functions of the operation mode indicator 66, also described with reference to FIG. 2.

The ASIC microprocessor 310 will always know a current state of the camera 300, and could easily store that state in an internal register that the microcode could read. The display controller 370 may wholly perform the functions of the icon controller 64, or the functions may be shared between the display controller and the microcode running on the ASIC microprocessor 310. The display controller 370 may include its own microcode stored in its own memory to help it implement its functions.

Implementation of the camera 300 is straightforward and is intuitive once the details of the invention as described above are known. As always, implementation of the invention is left to the system designer. The icon controller 64 from FIG. 2 may be built from scratch to include the logic necessary to drive the display 10, or an existing display controller may be modified to suit that purpose.

Software running on a general purpose or special purpose computing device could be used to implement any of the above described functions. The software could be in the form of a computer readable file, or, as described above may be loaded into a microprocessor from a memory device. In either example, as well as others, the invention would be contained on an article including machine-readable code, where execution of that code would implement the methods of the invention.

Thus, although there has been described to this point a particular embodiment for an information display status indicator, it is not intended that such specific references be considered as limitations upon the scope of this invention except in-so-far as set forth in the following claims.

What is claimed is:

1. An information viewing screen on a device that uses memory resources, comprising:
   a predetermined number of memory indicators disposed around a perimeter of a display; and
   an indicator controller structured to show a number of the memory indicators on the display corresponding to an amount of such memory resources used by the device and structured to display a pattern of the memory indicators that is unrelated to the amount of memory resources used by the device.

2. The information viewing screen according to claim 1 wherein the pattern of memory indicators changes over a period of time.

3. The information viewing screen according to claim 1 wherein the device is a camera capable of being coupled to a host computer, and wherein the indicator controller is structured to display the pattern of the memory indicators when the camera is coupled to the host computer.

4. The information viewing screen according to claim 1 wherein the indicator controller is structured to display either the number of memory indicators corresponding to an amount of memory resources used by the device or the pattern of memory indicators dependent on a state of the device.

5. The information viewing screen according to claim 4 wherein one state of the device is a sleep state and wherein the indicator controller is structured to display none of the memory indicators on the display when the device is in the sleep state.

6. The information viewing screen according to claim 1 wherein the predetermined number of memory indicators is 24, and wherein the 24 memory indicators are formed around a perimeter of a circular display having a diameter of about 17 mm.

7. The information viewing screen according to claim 1 wherein each of the memory indicators is physically separated from each of its next closest memory indicator by an area of the display that is not part of the memory indicators.

8. The information viewing screen according to claim 1 wherein each of the memory indicators is individually controllable by the indicator controller.

9. The information viewing screen according to claim 1 wherein the memory indicators are formed around the majority of a perimeter of a circular display.

10. The information viewing screen according to claim 1 wherein the display is an LCD device.

11. The information viewing screen according to claim 1 wherein the viewing screen appears as a component of another screen producing an image.

12. A method for displaying information about a device that consumes memory resources, comprising:

measuring an amount of memory resources presently consumed by the device;

displaying a number of icons in a segmented memory indicator that is positioned around a perimeter of a display screen, the number of icons displayed directly related to the amount of memory resources measured; and displaying a pattern of the icons in the memory segment indicators on the display screen that is unrelated to the amount of memory resources measured.

13. The method for displaying information according to claim 12 wherein displaying a number of icons in a segmented memory indicator comprises displaying a number of icons on an LCD device.

14. The method for displaying information according to claim 12 wherein displaying a number of icons in a segmented memory indicator comprises showing the number of icons over another screen producing an image.

15. A method for displaying information about a device that consumes memory resources and is capable of being coupled to a host computer, the method comprising:

measuring an amount of memory resources presently consumed by the device;

displaying a number of icons in a segmented memory indicator that is positioned around a perimeter of a display screen, the number of icons displayed directly related to the amount of memory resources measured; and displaying a pattern of the icons in the memory segment indicators on the display screen that is unrelated to the amount of memory resources measured when the device is coupled to the host computer.

16. The method for displaying information according to claim 15, further comprising checking a current mode of operation of the device, and deciding to display the number of icons related to the amount of resources used or to display the pattern of icons based on the current mode of operation of the device.

17. The method for displaying information according to claim 16, further comprising displaying no memory icons on the display screen when the current mode of operation of the device is a sleep mode.

18. A device, comprising:

a memory capable of having data stored therein;

a memory sensing facility structured to measure a quantity of data stored in the memory;

a display controller coupled to the memory sensing facility and structured to determine, based on a signal received from the memory sensing facility, a number of icons to display, and structured to designate a series of the plurality of controllable icons of the display screen as a pattern, and instruct the display screen to display the pattern of controllable icons; and a display screen coupled to the display controller and having a memory status bar formed of a plurality of controllable icons positioned around a perimeter of the display screen, the display screen operable to display a number of the plurality of controllable icons equal in number to the number of icons determined by the display controller.

19. The device according to claim 18 wherein the display controller is coupled to a device mode indicator, and wherein the display controller signals the display screen to show either the number of the plurality of controllable icons equal in number to the number of icons determined by the display controller or the pattern of controllable icons responsive to a signal received from the device mode indicator.

20. The device of claim 18 wherein the plurality of controllable icons positioned around a perimeter of the display screen is a set of 24 segments of a memory segment indictor disposed around a circular viewing screen having a diameter of roughly 17 mm.

21. The device of claim 18 wherein the device is capable of being coupled to a host computer, and wherein the display controller displays the pattern when the device is coupled to the host computer.

22. The device of claim 18 wherein the wherein the display screen is an LCD device.

23. The device of claim 18 wherein the display screen is superimposed on another screen capable of transmitting an image.

24. A device, comprising:

a memory capable of having data stored therein;

a memory sensing facility structured to measure a quantity of data stored in the memory;

a display controller coupled to the memory sensing facility and structured to determine, based on a signal received from the memory sensing facility, a number of icons to display; and a display screen coupled to the display controller and having a memory status bar formed of a plurality of controllable icons positioned around a perimeter of the display screen, wherein at least some of the plurality of controllable icons are formed with individually controllable pieces that are smaller than an entire icon, and the display screen operable to display a number of the plurality of controllable icons equal in number to the number of icons determined by the display controller.

* * * * *